United States Patent

[11] 3,592,487

[72] Inventor Richard C. Mansperger
 Peoria, Ariz.
[21] Appl. No. 844,747
[22] Filed July 25, 1969
[45] Patented July 13, 1971
[73] Assignee Gobby Mfg., Inc.
 Glendale, Ariz.

[54] TRICYCLE CHASSIS
 3 Claims, 4 Drawing Figs.
[52] U.S. Cl...................................................... 280/261,
 280/282, 224/32 R
[51] Int. Cl........................................................ B62k 5/04
[50] Field of Search............................................ 280/261,
 282, 7.15, 7.1, 202; 180/27; 224/31, 32 R

[56] References Cited
UNITED STATES PATENTS

| | | | |
|---|---|---|---|
| 3,229,988 | 1/1966 | Mansperger.................. | 280/7.15 |
| 3,258,273 | 6/1966 | Matthews..................... | 280/7.15 |
| 3,517,867 | 6/1970 | Fritz et al...................... | 224/31 |

FOREIGN PATENTS

| | | | |
|---|---|---|---|
| 797,867 | 7/1958 | Great Britain................ | 280/282 |
| 444,376 | 1/1949 | Italy ............................ | 180/27 |

*Primary Examiner*—Kenneth H. Betts
*Attorney*—Willard L. Groene

ABSTRACT: A tricycle chassis arranged for ease of operation of the tricycle, quick and easy changing of the rear tires, and having a novel basket-and-rear-fender assembly that can be quickly attached and removed from the chassis.

3,592,487

INVENTOR.
RICHARD C. MANSPERGER

INVENTOR.
RICHARD C. MANSPERGER
BY
Willard S. Graves
ATTORNEY

TRICYCLE CHASSIS

BACKGROUND OF THE INVENTION

This invention pertains to cycles, and is particularly directed to improvements in tricycle chassis construction.

Heretofore, tricycle chassis constructions were deficient in the problems created in changing the rear tires because of the interference of the basket and rear fenders of the bicycle. Further, prior devices had weak rear-wheel-and-axle assemblies and required outboard support for each of the rear wheels complicating the maintenance of the tricycle and making adjustments and keeping the rear wheels properly lined up.

SUMMARY OF THE INVENTION

One of the objects of this invention is to provide a tricycle chassis with a minimum of interference in getting on and off of the tricycle.

Another object is to provide a tricycle chassis having a rugged rear axle assembly with means for quickly and easily taking off and putting on the rear wheels.

Still another object is to provide a unique demountable frame containing the rear fenders and basket which may be quickly installed or removed from the chassis, with no special tools being required, and can be ridden satisfactorily without the basket, basket frame, and fenders.

DESCRIPTION OF THE PREFERRED EMBODIMENT

Figure 1:
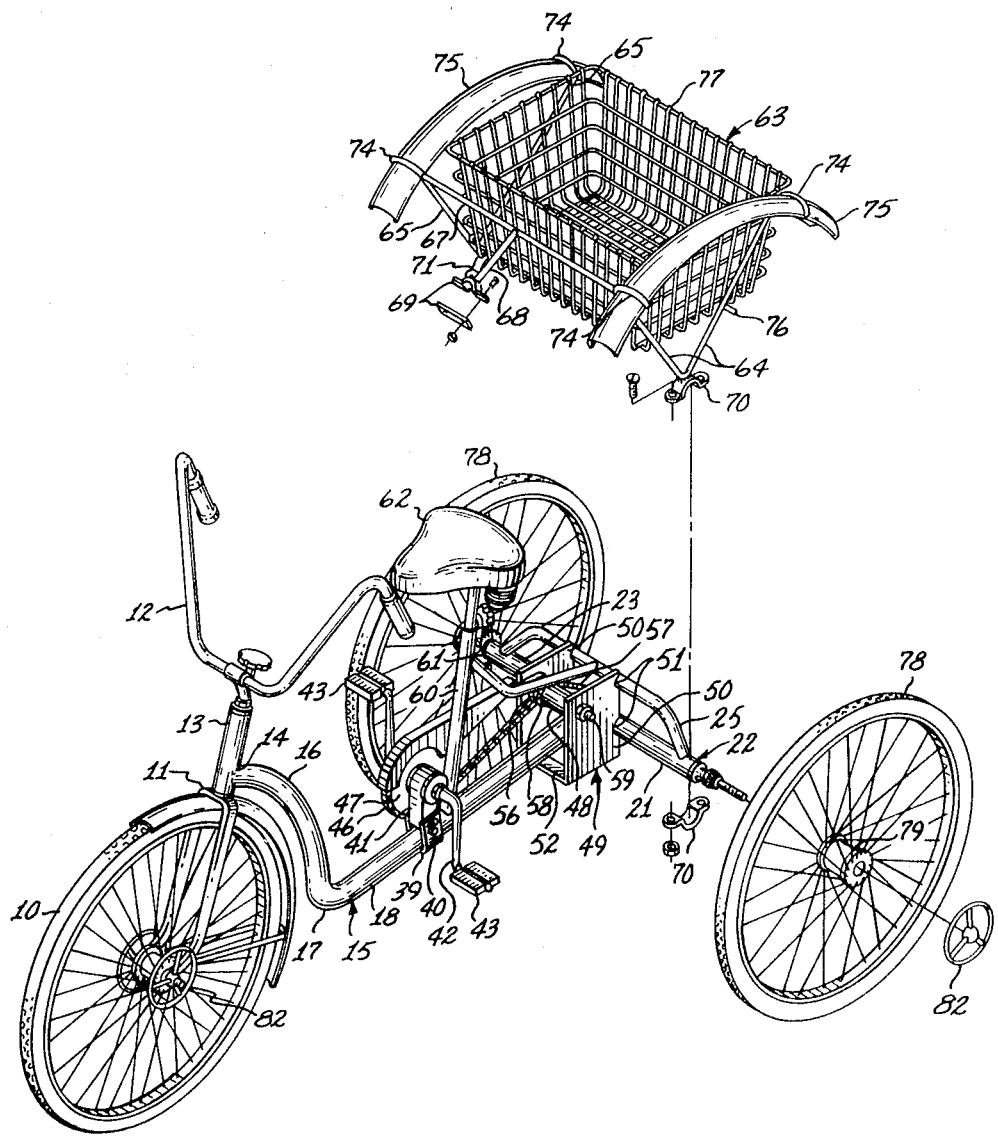
FIG. 1 is a perspective view of a tricycle having a chassis incorporating the features of this invention, in partly exploded view to better show the essential elements.

As an example of one embodiment of this invention, there is shown a tricycle having the usual front wheel 10, the steering fork 11, and the handlebars 12, the upper end of the fork being pivotally mounted in the usual bearings in the bushing 13. Fixed to the lower rear portion of the steering bushing 13 at 14 is the frame 15 comprising a single tubular frame member indicated generally at 15 having the rearwardly and downwardly curved portion 16 which is connected through a sharp turn 17 to the substantially horizontally rearwardly extending portion 18.

Figure 3:
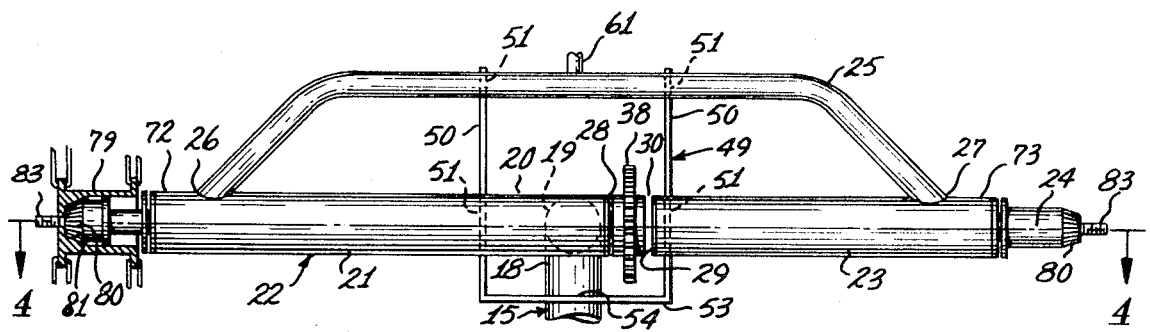
FIG. 3 is an enlarged view of the rear axle assembly indicated by the line 3–3 on FIG. 2.
Figure 4:
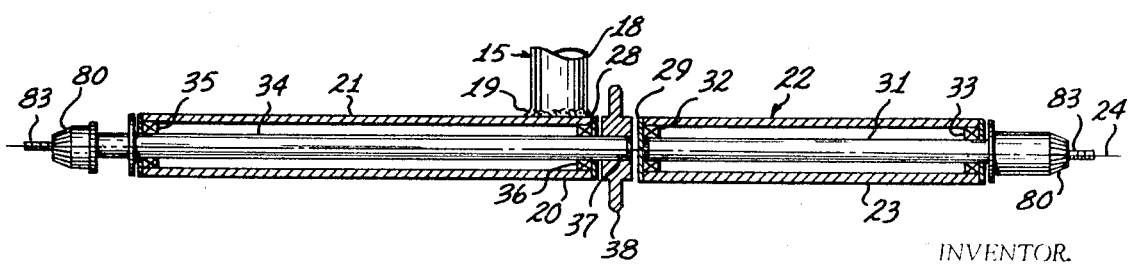
FIG. 4 is a sectional view on the line 4–4 of FIG. 3.

The rear end of the frame 15 is welded at 19 to the inner end 20 of the left-hand tubular member 21 of the rear axle assembly 22, shown best in FIGS. 3 and 4. The right-hand tubular member 23 is in axial alignment on the common rear wheel axis 24 with the left-hand tubular member 21 and is rigidly connected therewith by an upstanding strut 25 welded to the top of the tubular member 21 at 26 and the top of the tubular member 23 at 27, the tubular members 21 and 23 having their inner ends 28 and 29 axially spaced from each other to form a sprocket slot 30.

An idler axle 31 is journaled on suitable bearings 32 and 33 in the right-hand tubular member. A drive axle 34 is journaled on suitable bearings 35 and 36 in the left-hand tubular member 21, the inner end 37 of the drive axle projecting into the slot 30 and having a sprocket 38 suitably fixed thereto.

Figure 2:
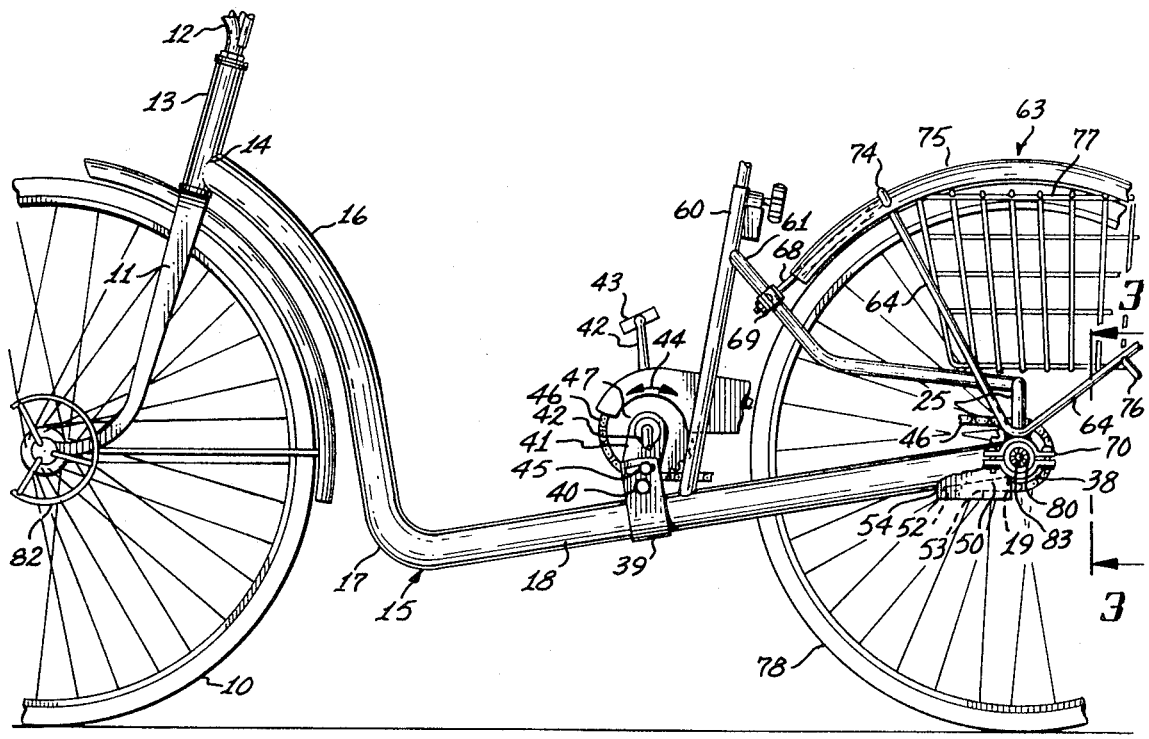
FIG. 2 is an enlarged fragmentary side elevation of the tricycle incorporating the features shown in FIG. 1.

A bracket 39, FIG. 2, is fixed at a suitable intermediate point on the rearwardly extending portion 18 of the frame 15 and has a horizontal transverse pivot bolt 40 upon which is pivotally mounted the pedal crank box 41 in which is journaled the conventional pedal crank shaft 42 having the usual bicycle pedals 43. The box 41 is therefore adjustable about the bolt 40 to swing to required positions as indicated by the arrow 44, the box 41 being clamped in desired positions by the clamp screw 45 threaded in the box 41 and operating in the arcuate slot on the bracket 39, the purpose of which is to appropriately adjust the drive chain 46 operating over the sprocket 38 and the usual sprocket wheel 47 of the pedal crank 42.

If desired, a change-speed transmission 48 may be provided between the axle sprocket 38 and the pedal sprocket wheel 47. To this end there is provided a transmission support box 49 having spaced vertical plates 50 welded at 51 to the front portions of the axle assembly portions 21, 23, and 25. Bottom integral struts 52 and 53 tie the side plates 50 together, the strut 52 being welded at 54 to the underside of the portion 18 of the frame 15. In this arrangement shown in FIG. 1, a chain 46 from the sprocket 47 goes to the input sprocket 56 of the change-speed transmission 48 while a second chain 57 connects the output sprocket 58 of the sprocket of the transmission 48 to the sprocket 38. The transmission 48 is mounted in a conventional manner by its support shaft 59 on the side plates 50 with the usual controls, not shown, being provided.

A seat support tube 60 is welded at its lower end to the portion 18 of the frame 15 and a rearwardly extending strut 61 is interconnected between the upper end of the tube 60 and the axle assembly 25 to provide rigidity for the seat 62.

An improved easily demountable rear-fender-and-basket assembly indicated generally at 63 comprises a pair of V-shaped fender support frames 64 and 65 joined together at their outer front portions 66 by the transverse tie rod 67 having a forwardly projecting rod 68 terminating in a clamp 69 arranged to be demountably connected to the seat support tube strut 61. Fixed to the junction of the V-shaped frames 64 and 65 are similar clamps 70 and 71 arranged to demountably grip around the outer ends 72 and 73 of the axle tubes 21 and 23.

The upper ends of the V-shaped frames have outwardly extending curved pieces 74 to which the rear fenders 75 are fixed. A crosstie 76 between the V-shaped members 64 and 65 serves to further stiffen these members and provides a bottom support for the basket 77 which may also be secured at various other points by suitable clips, not shown, to the V-shaped frames 64 and 65 and the tie rod 67.

The rear wheels 78 are standard coaster-brake wheels with the inner mechanism of the hubs 79 removed. Enlarged tapered serrated or splined shaft spindles 80 positively drivingly engage in the normal bore surfaces 81 of the hubs 79 and are locked in place by suitable hand wheel nuts 82 on the threaded studs 83 fixed in the outer ends of the axle shafts 31 and 34.

I claim:

1. A three-wheel tricycle chassis including:
A. a front-wheel steering fork and handlebar assembly,
B. a steering bushing rotatably supporting the steering fork,
C. a frame comprising a single tubular member having,
D. a front end portion fixed to the lower end of the rear portion of the steering bushing,
E. a rearwardly and downwardly curved portion extending from the front end portion of the frame terminating in a sharp turn to a substantially rearwardly projecting portion,
F. and a substantially horizontally disposed rear portion of the frame fixed at its front end to the rearwardly projecting portion of the sharp turn,
G. a rear axle assembly fixed to the rear end of the rear portion of the frame,
H. said rear axle assembly comprising a left-hand tubular member having the front portion of its inner end fixed to the rear end of the frame,
I. a right-hand tubular member in axial alignment with and axially spaced from the left-hand tubular member forming a sprocket slot between the inner ends thereof,
J. and an upstanding strut fixed to the top portions of each tubular member to maintain their alignment,
K. an idler axle journaled in the right-hand tubular member,
L. a drive axle journaled in the left-hand tubular member,
M. a sprocket fixed on the inner end of the drive axle located within the sprocket slot, N. a pedal crank on the rearwardly extending portion of the frame having a sprocket fixed thereto, O. and a drive chain interconnecting the sprockets.

2. A three-wheel tricycle chassis as in claim 1 wherein said chain drive interconnecting the sprockets includes a change speed transmission mounted on the rear portion of the frame and on the axle assembly tubular member and strut.

3. A three-wheel tricycle chassis as in claim 1 wherein the rear axle assembly includes axle shafts and axially demountable rear wheels on the outer ends of the axle shafts, and a basket assembly including a frame demountably clamped to the outer ends of the rear axle assembly adjacent the inside of the rear wheels, and rear fenders fixed to the basket assembly located over the rear wheels.